United States Patent
Pilard

(10) Patent No.: US 11,940,619 B2
(45) Date of Patent: Mar. 26, 2024

(54) MIRROR DEVICE AND PRODUCTION METHOD FOR A MIRROR DEVICE

(71) Applicant: Robert Bosch GmbH, Stuttgart (DE)

(72) Inventor: Gael Pilard, Wankheim (DE)

(73) Assignee: Robert Bosch GmbH, Stuttgart (DE)

(*) Notice: Subject to any disclaimer, the term of this patent is extended or adjusted under 35 U.S.C. 154(b) by 662 days.

(21) Appl. No.: 17/255,880

(22) PCT Filed: Jun. 18, 2019

(86) PCT No.: PCT/EP2019/066038
§ 371 (c)(1),
(2) Date: Dec. 23, 2020

(87) PCT Pub. No.: WO2020/011495
PCT Pub. Date: Jan. 16, 2020

(65) Prior Publication Data
US 2021/0263304 A1    Aug. 26, 2021

(30) Foreign Application Priority Data

Jul. 11, 2018 (DE) .......................... 102018211545.1

(51) Int. Cl.
*G02B 26/08* (2006.01)
*G02B 26/10* (2006.01)

(52) U.S. Cl.
CPC ....... *G02B 26/101* (2013.01); *G02B 26/0833* (2013.01)

(58) Field of Classification Search
CPC .......................... G02B 26/101; G02B 26/0833; G02B 5/0816; G02B 27/0018
See application file for complete search history.

(56) References Cited

U.S. PATENT DOCUMENTS 9,348,134 B2 * 5/2016 Ichii .................. G02B 26/0833
2008/0239429 A1   10/2008 Sandner
(Continued)

FOREIGN PATENT DOCUMENTS

| CN | 103257449 A | 8/2013 |
| CN | 104423036 A | 3/2015 |

(Continued)

OTHER PUBLICATIONS

International Search Report for PCT/EP2019/066038, dated Oct. 7, 2019.

*Primary Examiner* — Euncha P Cherry
(74) *Attorney, Agent, or Firm* — NORTON ROSE FULBRIGHT US LLP; Gerard A. Messina

(57) ABSTRACT

A mirror device including a micromirror, which is excitable to an oscillatory motion such that a first impingement angle of a beam of light impinging upon its reflective surface varies within a first value range, and a cover element, which is stationary so that, due to the reflection at the reflective surface, the beam impinges upon at least one inner surface of the cover element and partially impinges as reflection beam upon the reflective surface. The cover element is aligned at an incline relative to a neutral position of the micromirror such that a second impingement angle of the reflection beam impinging upon the micromirror lies within a second value range outside the first value range. The reflective surface has a coating, which has a reflection coefficient of at least 0.6 for the first value range and a reflection coefficient of maximally 0.4 for the second value range.

12 Claims, 3 Drawing Sheets

(56) References Cited

U.S. PATENT DOCUMENTS

2013/0242275 A1* 9/2013 Kilcher ............... G02B 5/0278
  353/121
2014/0355095 A1   12/2014 Naftali et al.

FOREIGN PATENT DOCUMENTS

| DE | 102008012810 | A1 | 10/2008 |
| DE | 102012219666 | A1 | 10/2012 |
| WO | 2011134513 | A1 | 11/2011 |
| WO | 2018045402 | A1 | 3/2018 |

* cited by examiner

MIRROR DEVICE AND PRODUCTION METHOD FOR A MIRROR DEVICE

FIELD

The present invention relates to a mirror device. In the same way, the present invention relates to a production method for a mirror device.

BACKGROUND INFORMATION

Conventional mirror devices having at least one pivotably mounted micromirror placed behind a transparent cover element are described in, e.g., German Patent No. DE 10 2008 012 810 B4. Accordingly, it is also conventional to align the cover element at an incline with respect to the micromirror present in its neutral position.

FIGS. 1a and 1b show a schematic illustration of such a conventional mirror device and a pixel image which can be produced with the aid of the conventional mirror device.

The mirror device according to the related art schematically reproduced in FIG. 1a includes at least a pivotably mounted micromirror 10, which is able to be excited from a neutral position of micromirror 10 to an oscillatory motion about an axis of rotation (aligned perpendicular to the image plane). Disposed upstream from micromirror 10 is a cover element 12 through which a beam of light 16 falls that is directed toward a reflective surface 14 of micromirror 10. Merely by way of example, the conventional mirror device of FIG. 1a also has a further pivotably mounted micromirror 20 situated behind an additional cover element 18, by which beam of light 16 is deflectable about a further axis of rotation (situated in the image plane) prior to its transmission through cover element 12 and prior to its impingement upon reflective surface 14 of micromirror 10.

As can be gathered from FIG. 1a, beam of light 16 impinging upon reflective surface 14 of micromirror 10 is deflected in the direction of cover element 12 due to its reflection at reflective surface 14, and a portion of a light impinging upon at least an inner surface 22 of cover element 12 impinges anew, as a so-called reflection beam 24, upon reflective surface 14 of micromirror 10, while the rest of the light impinging upon the respective inner surface 22 of cover element 12 is transmitted as output beam 26 through cover element 12 and impinges upon a projection surface 28.

Reflection beam 24 impinging upon reflective surface 14 is reflected anew and deflected by reflective surface 14 in the direction of cover element 12. The light impinging upon the at least one inner surface 22 of cover element 12 is (largely) transmitted as what is known as an artefact beam of light 30 through cover element 12 and impinges upon projection surface 28. However, since artefact beam of light 30 was deflected twice at reflective surface 14 of micromirror 10 (and at the at least one inner surface 22 of cover element 12), a point of impingement P2 of artefact beam of light 30 usually deviates considerably from a point of impingement P1 of output beam 26.

FIG. 1b shows a top view of projection surface 28 with the pixel image created by the conventional mirror device of FIG. 1a. It can be gathered that in addition to image pixels P1 of a "desired pixel image" induced with the aid of output beam 26, the pixel image also includes interfering artefact pixels P2 attributable to artefact beam of light 30. A light intensity of artefact pixels P2 often amounts to approximately 0.5% to 1% of a light intensity of image pixels P1.

SUMMARY

The present invention provides a mirror device and a production method for a mirror device.

The present invention provides mirror devices which are suitable for producing a pixel image on a projection surface, in which the occurrence of visible artefact pixels caused by an undesired reflection at the at least one cover element of the respective mirror device is suppressed or prevented. The mirror devices provided in accordance with the present invention are therefore suitable for generating pixel images of a better image quality than in the related art. The improved image quality notwithstanding, it is not necessary to dispense with the placement of the at least one pivotably mounted micromirror behind its protective cover element, as will be described in greater detail in the following text. The pivotably mounted micromirror may thus be easily protected from dirt or damage with the aid of its cover element as part of a fluid-tight or hermetic packaging. The improvement in the image quality of the pixel image produced with the aid of a mirror device according to the present invention is consequently achievable also without an increased risk of contamination and/or damage.

The mirror devices provided by the present invention consequently provide great robustness and are suitable for a high-quality image projection featuring an improved image quality. As will be described in greater detail in the following text, the present invention provides cost-effective options for improving the image quality of a pixel image produced by a mirror device. Another advantage of the present invention is that only small changes have to be made to a conventional geometry of a mirror device according to the related art for its realization. For example, it will thus not be necessary to reduce an extension of the reflective surface of the micromirror in order to prevent an impinging of the reflection beam upon the reflective surface. A realization of the present invention therefore also does not restrict the design freedom in the design of mirror devices or restricts it only to a negligible extent.

In one advantageous embodiment of the mirror device in accordance with an example embodiment of the present invention, the second value range=$[\Theta_{2\_min}, \Theta_{2\_max}]$ lies outside the first value range=$[\Theta_{1\_min}, \Theta_{1\_max}]$. As will be described in greater detail in the following text, this can be easily ensured.

In a further advantageous embodiment of the mirror device in accordance with the present invention, the coating has a reflection coefficient of at least 0.75 for the first value range=$[\Theta_{1\_min}, \Theta_{1\_max}]$ and/or a reflection coefficient of maximally 0.3 for the second value range=$[\Theta_{2\_min}, \Theta_{2\_max}]$. For example, the coating for the first value range=$[\Theta_{1\_min}, \Theta_{1\_max}]$ may have a reflection coefficient of at least 0.85 and/or a reflection coefficient of maximally 0.25 for the second value range=$[\Theta_{2\_min}, \Theta_{2\_max}]$. A reflection of the reflection beam impinging upon the reflective surface of the micromirror may thereby be reliably prevented while the desired deflection/reflection of the beam of light impinging upon the reflective surface for the generation of a pixel image is simultaneously ensured.

Preferably, the micromirror is able to be excited from its neutral position to the oscillatory motion about the axis of rotation for all adjustment angles $\beta$, in an adjustment angular range between $-\beta_{max}$ and $\beta_{max}$ in relation to the neutral position of the micromirror, with the following applying to angle of inclination $\gamma$: $\gamma > 2\beta_{max}$. As will be described in greater detail below, it is always ensured in this case that the second impingement angle $\theta_2$ of the reflection beam impinging upon the oscillating micromirror lies outside the first value range.

If the micromirror is able to be excited from its neutral position to the oscillatory motion about the axis of rotation for all adjustment angles $\beta$, in the adjustment angular range between $-\beta_{max}$ and $\beta_{max}$ in relation to the neutral position of the micromirror, then an angle $\alpha$ is definable between the beam of light impinging upon the reflective surface of the micromirror present in its neutral position and an axis aligned perpendicular to the reflective surface of the micromirror present in its neutral position, the coating for an impingement angle smaller than or equal to $\Theta_{1\_max}=\alpha+\beta_{max}$ having the reflection coefficient of at least 0.6, and for an impingement angle greater than or equal to $\Theta_{2\_min}=\alpha-3\beta_{max}+2\gamma$ having the reflection coefficient of maximally 0.4. In this case as well, the coating for the impingement angle smaller than or equal to $\Theta_{1\_max}=\alpha+\beta_{max}$ may have the reflection coefficient of at least 0.75 and/or for the impingement angle greater than or equal to $\Theta_{2\_min}=\alpha-3\beta_{max}+2\gamma$ may have the reflection coefficient of maximally 0.3. For example, the coating for the impingement angle smaller than or equal to $\Theta_{1\_max}=\alpha+\beta_{max}$ may have the reflection coefficient of at least 0.85 and/or the impingement angle greater than or equal to $\Theta_{2\_min}=\alpha-3\beta_{max}+2\gamma$ may have the reflection coefficient of maximally 0.25.

If the micromirror is able to be excited from its neutral position to the oscillatory motion about the axis of rotation for all adjustment angles $\beta$ in the adjustment angular range between $-\beta_{max}$ and $\beta_{max}$ in relation to the neutral position of the micromirror, and if the angle $\alpha$ between the beam of light impinging upon the reflective surface of the micromirror present in its neutral position and an axis aligned perpendicular to the reflective surface of the micromirror present in its neutral position is definable, then the coating may have a reflection edge at an impingement angle $\theta_0=\alpha-\beta_{max}+\gamma$. As will be described in greater detail in the following text, such a development of the coating provides the afore-described advantages.

The advantages described above may also be ensured when executing a corresponding production method for a mirror device. It is expressly pointed out that the production method for a mirror device according to the afore-described embodiments of the mirror device may be refined further.

BRIEF DESCRIPTION OF THE DRAWINGS

Additional features and advantages of the present invention will be described in the following text on the basis of the figures.

DETAILED DESCRIPTION OF EXAMPLE EMBODIMENTS

Figure 1A:
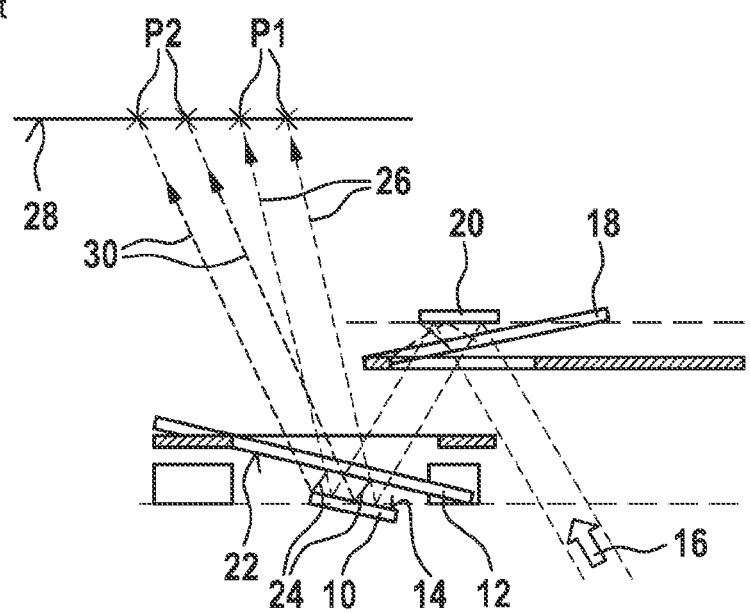
FIGS. 1a and 1b shows a schematic representation of such a conventional mirror device and a pixel image able to be produced by the conventional mirror device.
Figure 1B:
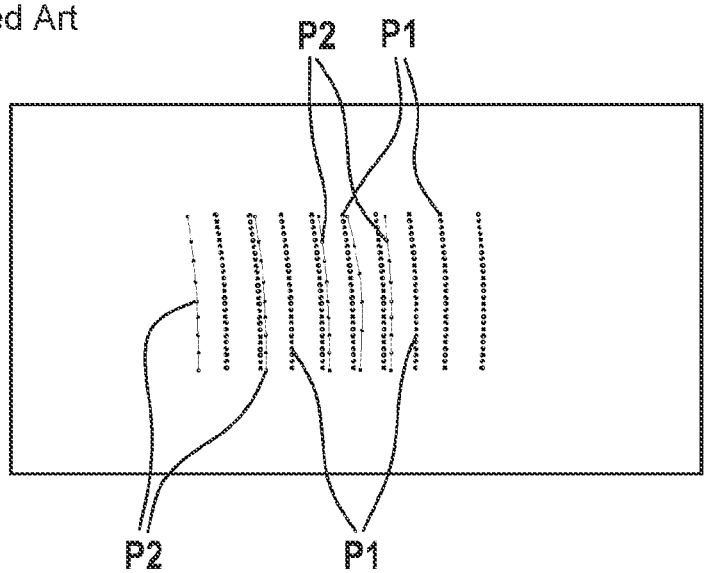
Figure 2A:
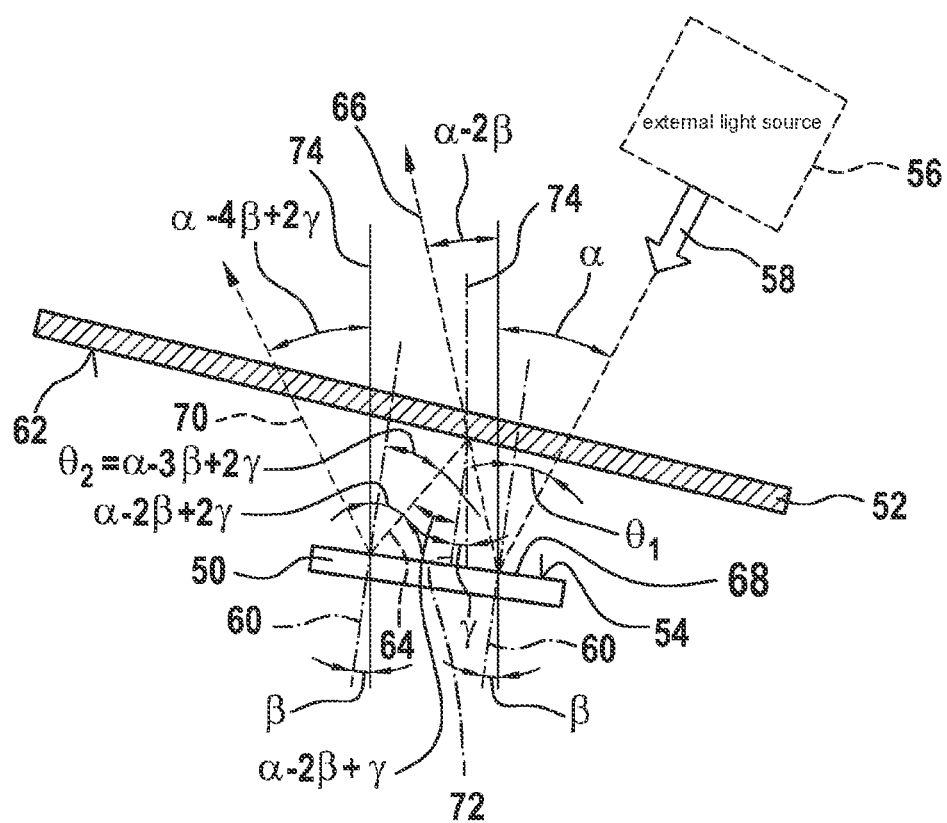
FIGS. 2a and 2b shows a schematic illustration of a specific embodiment of the mirror device according to the present invention and a coordinate system in order to describe a physical property of the mirror device according to the present invention.
Figure 2B:
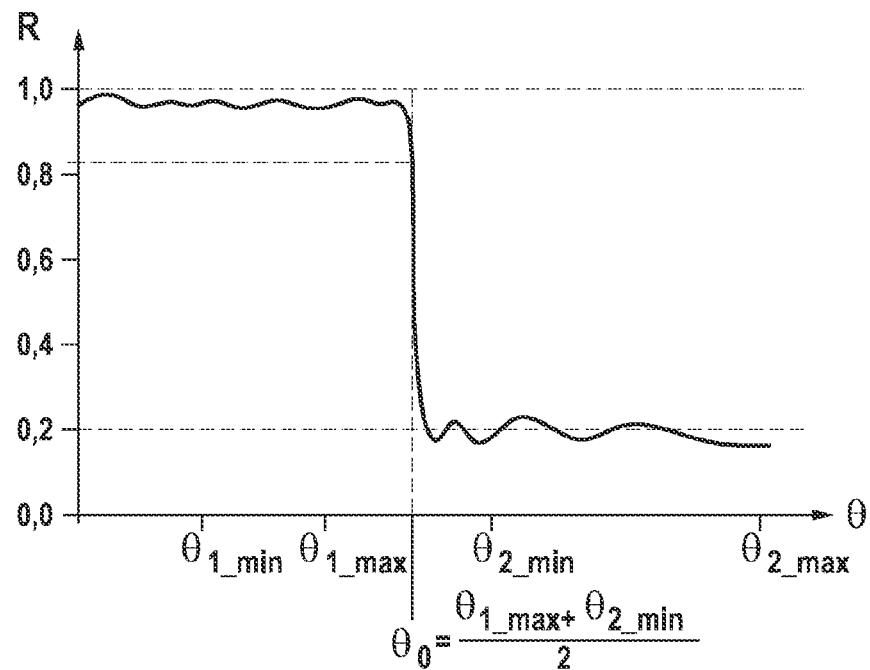

FIGS. 2a and 2b show a schematic representation of a specific embodiment of the mirror device according to the present invention and a coordinate system for describing a physical property of the mirror device according to the present invention.

The mirror device schematically shown in FIG. 2a exemplarily has only one pivotably mounted micromirror 50 and only the single cover element 52 allocated to micromirror 50. However, it is pointed out that in an optional further development, the mirror device may also have an additional, pivotably mounted micromirror, possibly provided with an additional cover element. A realizability of the mirror device described in the following text is therefore not restricted to devices having only the one pivotably mounted micromirror 50 and its cover element 52.

Pivotably mounted micromirror 50 has a reflective surface 54 upon which a beam of light 58 impinges which is emitted by a light source of the mirror device or by an external light source 56. Moreover, micromirror 50 is excitable from a neutral position of micromirror 50 (not shown in FIG. 2a) to an oscillatory motion about an axis of rotation (aligned perpendicular to the image plane of FIG. 2a) such that a first impingement angle/angle of incidence $\Theta_1$ of beam of light 58 impinging upon oscillating micromirror 50 varies within a first value range of $\Theta_{1\_min}$ to $\Theta_{1\_max}$. As may be gathered from FIG. 2a, first impingement angle $\theta_1$ is defined as an angle between beam of light 58 impinging upon micromirror 50 and a (co-varying) axis 60 aligned perpendicular to reflective surface 54 of oscillating micromirror 50.

Cover element 52 is immovable in relation to the mounting of micromirror 50. In addition, cover element 52 is transparent to beam of light 58 emitted by light source 56, and cover element 52 is situated in such a way in relation to micromirror 50 that beam of light 58 emitted by light source 56 impinges upon reflective surface 54 of micromirror 50 through cover element 52. Because of the reflection at reflective surface 54, beam of light 58 impinging upon reflective surface 54 is deflected in the direction of cover element 52 and is therefore incident on at least an inner surface 62 of cover element 52, inner surface 62 of cover element 52 describing a surface of cover element 52 that is aligned with respect to reflective surface 54 of micromirror 50. Due to its reflection at respective inner surface 62, a portion of the light impinging upon respective inner surface 62 is reflected in the direction of reflective surface 54 as a so-called reflection beam 64, while the rest of the light impinging upon respective inner surface 62 is transmitted as output beam 66 through cover element 52.

Reflection beam 64 once again impinges upon reflective surface 54 of micromirror 50, a second impingement angle/incident light angle $\theta_2$ being definable for reflection beam 64 impinging upon reflective surface 54 of micromirror 50. For example, second impingement angle $\theta_2$ is defined as an angle between reflection beam 64 impinging upon micromirror 50 and (co-varying) axis 60 aligned perpendicular to reflective surface 54 of oscillating micromirror 50.

However, reflective surface 54 of micromirror 50 is at least partially covered with a coating 68, which ensures a satisfactory reflection of beam of light 58 to be deflected at reflective surface 54 of micromirror 50 (with a relatively high reflection coefficient/reflection factor R) on the one hand, but suppresses/prevents a reflection of reflection beam 64 impinging upon reflective surface 54 of micromirror 50 as an artefact beam of light 70 on the other hand. Artefact beam of light 70 is therefore drawn in only as a dashed line in FIG. 2a.

As may be gathered from FIG. 2a, cover element 52 is inclined at an angle of inclination $\gamma$ in relation to micromirror 50 present in its neutral position. For example, angle of inclination $\gamma$ in FIG. 2a is drawn in as an angle between an axis 72 aligned perpendicular to cover element 52 and an axis 74 aligned perpendicular to reflective surface 54 of micromirror 50 present in its neutral position. Angle of inclination γ is specified so that second impingement angle $\Theta_2$ of reflection beam 64 impinging upon the oscillating micromirror lies within a second value range of $\Theta_{2\_min}$ to $\Theta_{2\_max}$ and outside the first value range of $\Theta_{1\_min}$ to $\Theta_{1\_max}$.

In the coordinate system of FIG. 2b, an abscissa indicates an impingement angle/angle of incidence Θ, while reflection coefficient/reflection factor R of coating 68 of reflective surface 54 of micromirror 50, which is a function of impingement angle/angle of incidence Θ, is represented by an ordinate. It can be seen that coating 68 has a reflection coefficient R of at least 0.6 for the first value range of $\Theta_{1\_min}$ to $\Theta_{1\_max}$, and a reflection coefficient R of maximally 0.4 for the second value range of $\Theta_{2\_min}$ to $\Theta_{2\_max}$. Coating 68 thus does not affect the reflection of beam of light 58 at reflective surface 54 for the desired generation of output beam 66 or barely affects it at all, but it prevents/inhibits its reflection during the impingement of reflection beam 64 upon reflective surface 54 and thus advantageously counteracts the undesired occurrence of artefact beam of light 70.

For example, coating 68 for the first value range of $\Theta_{1\_min}$ to $\Theta_{1\_max}$ may have a reflection coefficient R of at least 0.75, in particular a reflection coefficient R of at least 0.85. No intensity attenuation of output beam 66 must therefore be expected. In addition or as an alternative, coating 68 for the second value range of $\Theta_{2\_min}$ to $\Theta_{2\_max}$ may have a reflection coefficient R of maximally 0.3 and preferably a reflection coefficient of maximally 0.25. The intensity of artefact beam of light 70 is negligibly low here for all mentioned maximum values of reflection coefficient R for the second value range of $\Theta_{2\_min}$ to $\Theta_{2\_max}$. In a projection of a pixel image with the aid of output beam 66 emitted by the mirror device schematically illustrated in FIG. 2a, the intensities of the artefact pixels attributable to artefact beam of light 70 are so low that the artefact pixels are not visible or perceivable. The pixel image generated with the aid of the mirror device thus has a considerably improved image quality compared to the related art. Since the artefact pixels are not visible or perceivable because of their low intensities, the pixel image produced on a projection surface also has a greater brightness contrast compared to the related art or an improved contrast ratio between the image pixels generated by output beam 66 and non-illuminated subsurfaces of the projection surface. The greater brightness contrast improves the perceivability of the pixel image produced on the projection surface for an observer and also makes it easier for the observer to recognize the information optically displayed to him or her by the pixel image.

For instance, a first mean value $R_1$ of reflection coefficient R of coating 68 within the first value range of $\Theta_{1\_min}$ to $\Theta_{1\_max}$ may be greater by a factor of at least 3, in particular by a factor of at least 5, and preferably by a factor of at least 7, than a second mean value $R_2$ of reflection coefficient R of coating 68 within the second value range of $\Theta_{2\_min}$ to $\Theta_{2\_max}$. A brightness contrast/contrast ratio of the pixel image produced by the mirror device is thereby able to be increased by the same factor between first mean value $R_1$ and second mean value $R_2$.

A chemical realization of coating 68 featuring the desired dependency of its reflection coefficient R from impingement angle/angle of incidence Θ, i.e. with the desired minimum value of reflection coefficient R for the first value range of $\Theta_{1\_min}$ to $\Theta_{1\_max}$, with the desired maximum value of reflection coefficient R for the second value range of $\Theta_{2\_min}$ to $\Theta_{2\_max}$, and/or with the desired factor between first mean value $R_1$ and second mean value $R_2$, is easily possible. For that reason, the materials suitable for forming coating 68 and their desired concentrations will not be described here in greater detail.

As may furthermore be gathered from FIG. 2a, the mirror device provides the afore-described advantages without requiring a reduction of reflective surface 54 of micromirror 50. To ensure these advantages, there is also no need to comply with special demands on a geometry or a design of the mirror device. The mirror device schematically shown in FIG. 2a is thus able to be developed with a relatively great design freedom.

In general, an angle α between beam of light 58 impinging upon reflective surface 54 of micromirror 50 present in its neutral position and axis 74 aligned perpendicular to reflective surface 54 of micromirror 50 present in its neutral position is known or is able to be established by an adjustment. In the same way, the mirror device is often designed in such a way that micromirror 50 is able to be excited from its neutral position to the oscillatory motion about the axis of rotation for all adjustment angles β in an adjustment angular range between $-\beta_{max}$ and $\beta_{max}$ in relation to the neutral position of micromirror 50. Current adjustment angle β of micromirror 50 excited to the oscillatory motion is the angle between axis 74 aligned perpendicular to the reflective surface of the micromirror present in its neutral position and the (co-varying) axis 60 aligned perpendicular to reflective surface 54 of oscillating micromirror 50.

First impingement angle $\Theta_1$ of beam of light 58 upon reflective surface 54 of oscillating micromirror 50 is able to be defined according to the equation (eq. 1) as:

$$\Theta_1 = \alpha - \beta. \qquad \text{(eq. 1)}$$

Accordingly, second impingement angle $\Theta_2$ of reflection beam 64 upon reflective surface 54 of oscillating micromirror 50 is able to be defined according to the equation (eq. 2) by:

$$\Theta_2 = \alpha - 3\beta + 2\gamma. \qquad \text{(eq. 2)}$$

In order to ensure that second impingement angle $\Theta_2$ of reflection beam 64 on reflective surface 54 always lies within the second value range of $\Theta_{2\_min}$ to $\Theta_{2\_max}$ and outside the first value range of $\Theta_{1\_min}$ to $\Theta_{1\_max}$ for all adjustment angles β of micromirror 50 incited to the oscillatory motion, the following must apply according to the equation (eq. 3):

$$\Delta = \Theta_{2\_min} - \Theta_{1\_max} > 0. \qquad \text{(eq. 3)}$$

With the aid of the equations (eq. 1) and (eq. 2), the following equations (eq. 4) and (eq. 5) for the limit values $\Theta_{1\_max}$ and $\Theta_{2\_min}$ are able to be derived:

$$\Theta_{1\_max} = \alpha - (-\beta_{max}) = \alpha + \beta_{max} \qquad \text{(eq. 4)}$$

$$\Theta_{2\_min} = \alpha - 3\beta_{max} + 2\gamma \qquad \text{(eq. 5)}$$

At an angle α of 30°, a maximum adjustment angle $\beta_{max}$ of 7.0° and an angle of inclination γ of 15.0°, limit values $\Theta_{1\_min} = 23°$ and $\Theta_{1\_max} = 37°$ and limit values $\Theta_{2\_min} = 39°$ and $\Theta_{2\_max} = 81°$ are able to be calculated.

The equation (eq. 3) thus is simplified to the equation (eq. 6):

$$\Delta = (\alpha - 3\beta_{max} + 2\gamma) - (\alpha + \beta_{max}) = 2(\gamma - 2\beta_{max}) > 0. \qquad \text{(eq. 6)}$$

Second impingement angle $\theta_2$ of reflection beam 64 upon reflective surface 54 thus lies always within the second value range of $\Theta_{2\_min}$ to $\Theta_{2\_max}$ and outside the first value range of $\Theta_{1\_min}$ to $\Theta_{1\_max}$ for all adjustment angles β of micromirror 50 incited to the oscillatory motion, provided the following applies to angle of inclination γ:

$$\gamma > 2\beta_{max}. \quad \text{(eq. 7)}$$

Preferably, the equation (eq. 7) is therefore satisfied for angle of inclination γ.

With the aid of the equations (eq. 1) and (eq. 2), it also can be expressed that it is advantageous if coating 68 has the reflection coefficient R of at least 0.6 for impingement angle Θ smaller than or equal to $\Theta_{1\_max} = \alpha + \beta_{max}$, and the reflection coefficient R of maximally 0.4 for impingement angle Θ greater than or equal to $\Theta_{2\_min} = \alpha - 3\beta_{max} + 2\gamma$. For impingement angle Θ smaller than or equal to $\Theta_{1\_max} = \alpha + \beta_{max}$, coating 68 preferably has a reflection coefficient R of at least 0.75 (in particular of at least 0.85), and for impingement angle Θ greater than or equal to $\Theta_{2\_min} = \alpha - 3\beta_{max} + 2\gamma$, it has a reflection coefficient R of maximally 0.3 (in particular of maximally 0.25).

As can be gathered on the basis of the coordinate system of FIG. 2b, coating 68 may have a reflection edge at an impingement angle $\Theta_0$ between the limit values of $\Theta_{1\_max}$ and $\Theta_{2\_min}$. Impingement angle $\Theta_0$ preferably lies at the same distance to limit values $\Theta_{1\_max}$ and $\Theta_{2\_min}$. This is satisfied if the following applies according to the equation (eq. 8):

$$\Theta_0 = \tfrac{1}{2}(\Theta_{2\_min} + \Theta_{1\_max}) = \alpha - \beta_{max} + \gamma. \quad \text{(eq. 8)}$$

As an optional further refinement, an anti-reflective coating is additionally able to be applied to an outer surface of cover element 52 facing away from the at least one inner surface 62.

Figure 3:
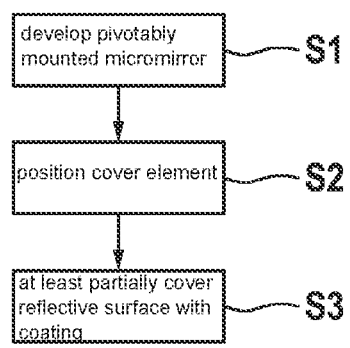
FIG. 3 shows a flow diagram to describe a specific embodiment of the production method for a mirror device, in accordance with an example embodiment of the present invention.

FIG. 3 shows a flow diagram to describe a specific embodiment of the production method for a mirror device.

Using the production method described below, the previously described mirror device, for instance, is able to be produced. However, an executability of the production method is not restricted to the production of this particular mirror device.

In a method step S1, a pivotably mounted micromirror of the later mirror device, which has a reflective surface upon which a beam of light emitted by a light source of the mirror device or by an external light source impinges during an operation of the later mirror device, is developed in such a way that if the micromirror is excited from a neutral position of the micromirror to an oscillatory motion about an axis of rotation, a first impingement angle of the beam of light impinging upon the oscillating micromirror varies within a first value range. The micromirror is preferably designed in such a way that the micromirror is excitable, or is excited, from its neutral position to the oscillatory motion about the axis of rotation for all adjustment angles in an adjustment angular range between $-\beta_{max}$ and $\beta_{max}$ in relation to the neutral position of the micromirror.

In a further method step S2, a cover element, which is immovable in relation to the mounting of the micromirror and is transparent to the beam of light emitted by the light source, is positioned relative to the micromirror in such a way that the beam of light emitted by the light source impinges through the cover element upon the reflective surface of the micromirror, is reflected at the reflective surface to at least one inner surface of the cover element, and a portion of the light impinging upon the respective inner surface is reflected at the respective inner surface onto the reflective surface as a reflection beam. The cover element is aligned at an incline at an angle of inclination γ in relation to the micromirror situated in its neutral position. Angle of inclination γ is specified in such a way that a second impingement angle of the reflection beam impinging upon the oscillating micromirror lies within a second value range and outside the first value range. For the reasons stated earlier, angle of inclination γ is preferably specified so that the following applies to angle of inclination γ: $\gamma > 2\beta_{max}$.

In addition, in method step S3, the reflective surface of the micromirror is at least partially covered with a coating, which has a reflection coefficient of at least 0.6 for the first value range and a reflection coefficient of maximally 0.4 for the second value range. Thus, a mirror device produced with the aid of the afore-described production method likewise provides the advantages already described in the previous text.

Method steps S1 through S3 are able to be carried out in any sequence, at the same time or with a time overlap. Also, further features of the afore-described mirror device are able to be developed by further refining the production method described in this document.

What is claimed is:

1. A mirror device, comprising:
   a pivotably mounted micromirror having a reflective surface upon which a beam of light impinges, which is emitted by a light source of the mirror device or by an external light source, the micromirror being excitable from a neutral position of the micromirror to an oscillatory motion about an axis of rotation such that a first impingement angle of the light beam impinging upon the oscillating micromirror varies within a first value range; and
   a cover element which is immovable in relation to a mounting of the micromirror and is transparent to the beam of light emitted by the light source or the external light source, the cover element being positioned relative to the micromirror in such a way that the beam of light emitted by the light source or the external light source impinges through the cover element upon the reflective surface of the micromirror and due to a reflection at the reflective surface, impinges upon an inner surface of the cover element, a portion of the light impinging upon the inner surface impinging upon the reflective surface as a reflection beam, and the cover element is inclined at an angle of inclination in relation to the micromirror situated in its neutral position;
   wherein the angle of inclination is specified in such a way that a second impingement angle of the reflection beam impinging upon the oscillating micromirror varies within a second value range; and
   wherein the reflective surface of the micromirror is at least partially covered with a coating, which has a reflection coefficient of at least 0.6 for the first value range, and a reflection coefficient of maximally 0.4 for the second value range.

2. The mirror device as recited in claim 1, wherein the second value range lies outside the first value range.

3. The mirror device as recited in claim 1, wherein the coating for the first value range has a reflection coefficient of at least 0.75 and/or a reflection coefficient of maximally 0.3 for the second value range.

4. The mirror device as recited in claim 3, wherein the coating for the first value range has a reflection coefficient of at least 0.85, and/or a reflection coefficient of maximally 0.25 for the second value range.

5. A mirror device, comprising:
   a pivotably mounted micromirror having a reflective surface upon which a beam of light impinges, which is emitted by a light source of the mirror device or by an external light source, the micromirror being excitable from a neutral position of the micromirror to an oscillatory motion about an axis of rotation such that a first impingement angle of the light beam impinging upon the oscillating micromirror varies within a first value range; and a cover element which is immovable in relation to a mounting of the micromirror and is transparent to the beam of light emitted by the light source or the external light source, the cover element being positioned relative to the micromirror in such a way that the beam of light emitted by the light source or the external light source impinges through the cover element upon the reflective surface of the micromirror and due to a reflection at the reflective surface, impinges upon an inner surface of the cover element, a portion of the light impinging upon the inner surface impinging upon the reflective surface as a reflection beam, and the cover element is inclined at an angle of inclination in relation to the micromirror situated in its neutral position;

wherein the angle of inclination is specified in such a way that a second impingement angle of the reflection beam impinging upon the oscillating micromirror varies within a second value range; and wherein the reflective surface of the micromirror is at least partially covered with a coating, which has a reflection coefficient of at least 0.6 for the first value range, and a reflection coefficient of maximally 0.4 for the second value range, wherein the micromirror is excitable from its neutral position to the oscillatory motion about the axis of rotation for all adjustment angles $\beta$ in an adjustment angular range between $-\beta_{max}$ and $\beta_{max}$ in relation to the neutral position of the micromirror, and $\gamma > 2\beta_{max}$ applies to the angle of inclination $\gamma$.

6. A mirror device, comprising:

a pivotably mounted micromirror having a reflective surface upon which a beam of light impinges, which is emitted by a light source of the mirror device or by an external light source, the micromirror being excitable from a neutral position of the micromirror to an oscillatory motion about an axis of rotation such that a first impingement angle of the light beam impinging upon the oscillating micromirror varies within a first value range; and a cover element which is immovable in relation to a mounting of the micromirror and is transparent to the beam of light emitted by the light source or the external light source, the cover element being positioned relative to the micromirror in such a way that the beam of light emitted by the light source or the external light source impinges through the cover element upon the reflective surface of the micromirror and due to a reflection at the reflective surface, impinges upon an inner surface of the cover element, a portion of the light impinging upon the inner surface impinging upon the reflective surface as a reflection beam, and the cover element is inclined at an angle of inclination in relation to the micromirror situated in its neutral position;

wherein the angle of inclination is specified in such a way that a second impingement angle of the reflection beam impinging upon the oscillating micromirror varies within a second value range; and wherein the reflective surface of the micromirror is at least partially covered with a coating, which has a reflection coefficient of at least 0.6 for the first value range, and a reflection coefficient of maximally 0.4 for the second value range, wherein the micromirror is excitable from its neutral position to the oscillatory motion about the axis of rotation for all adjustment angles $\beta$ in an adjustment angular range between $-\beta_{max}$ and $\beta_{max}$ in relation to the neutral position of the micromirror, and an angle $\alpha$ between the beam of light impinging upon the reflective surface of the micromirror present in its neutral position and an axis aligned perpendicular to the reflective surface of the micromirror present in its neutral position is definable, and the coating has the reflection coefficient of at least 0.6 for an impingement angle smaller than or equal to $\alpha+\beta_{max}$, and the reflection coefficient of maximally 0.4 for an impingement angle greater than or equal $\alpha-3\beta_{max}+2\gamma$, wherein $\gamma$ is the angle of inclination.

7. The mirror device as recited in claim 6, wherein the coating for the impingement angle smaller than or equal to $\alpha+\beta_{max}$ has the reflection coefficient of at least 0.75, and/or for the impingement angle greater than or equal to $\alpha-3\beta_{max}+2\gamma$ has the reflection coefficient of maximally 0.3.

8. The mirror device as recited in claim 6, wherein the coating for the impingement angle smaller than or equal to $\alpha+\beta_{max}$ has the reflection coefficient of at least 0.85, and/or for the impingement angle greater than or equal to $\alpha-3\beta_{max}+2\gamma$ has the reflection coefficient of maximally 0.25.

9. A mirror device, comprising:

a pivotably mounted micromirror having a reflective surface upon which a beam of light impinges, which is emitted by a light source of the mirror device or by an external light source, the micromirror being excitable from a neutral position of the micromirror to an oscillatory motion about an axis of rotation such that a first impingement angle of the light beam impinging upon the oscillating micromirror varies within a first value range; and a cover element which is immovable in relation to a mounting of the micromirror and is transparent to the beam of light emitted by the light source or the external light source, the cover element being positioned relative to the micromirror in such a way that the beam of light emitted by the light source or the external light source impinges through the cover element upon the reflective surface of the micromirror and due to a reflection at the reflective surface, impinges upon an inner surface of the cover element, a portion of the light impinging upon the inner surface impinging upon the reflective surface as a reflection beam, and the cover element is inclined at an angle of inclination in relation to the micromirror situated in its neutral position;

wherein the angle of inclination is specified in such a way that a second impingement angle of the reflection beam impinging upon the oscillating micromirror varies within a second value range; and wherein the reflective surface of the micromirror is at least partially covered with a coating, which has a reflection coefficient of at least 0.6 for the first value range, and a reflection coefficient of maximally 0.4 for the second value range, wherein the micromirror is excitable from its neutral position to the oscillatory motion about the axis of rotation for all adjustment angles $\beta$ in the adjustment angular range between $-\beta_{max}$ and $\beta_{max}$ in relation to the neutral position of the micromirror, and an angle $\alpha$ between the beam of light impinging upon the reflective surface of the micromirror present in its neutral position and an axis aligned perpendicular to the reflective surface of the micromirror present in its neutral position is definable, and the coating has a reflection edge at an impingement angle $\alpha - \beta_{max} + \gamma$, wherein $\gamma$ is the angle of inclination.

10. A production method for a mirror device, comprising the following steps:
    developing a pivotably mounted micromirror of the mirror device, which has a reflective surface upon which a beam of light emitted by a light source of the mirror device or by an external light source impinges during an operation of the mirror device in such a way that when the micromirror is excited from a neutral position of the micromirror to an oscillatory motion about an axis of rotation, a first impingement angle of the beam of light impinging upon the oscillating micromirror varies within a first value range; and
    positioning a cover element which is immovable in relation to a mounting of the micromirror and is transparent to the beam of light emitted by the light source relative to the micromirror in such a way that the beam of light emitted by the light source impinges through the cover element upon the reflective surface of the micromirror, is reflected at the reflective surface to an inner surface of the cover element, and a portion of the light impinging upon the inner surface is reflected at the inner surface onto the reflective surface as a reflection beam, the cover element being aligned at an incline at an angle of inclination in relation to the micromirror situated in its neutral position;
    wherein the angle of inclination is specified in such a way that a second impingement angle of the reflection beam impinging upon the oscillating micromirror varies within a second value range; and
    wherein the reflective surface of the micromirror is at least partially covered with a coating, which has a reflection coefficient of at least 0.6 for the first value range, and a reflection coefficient of maximally 0.4 for the second value range.

11. The production method as recited in claim 10, wherein the second value range lies outside the first value range.

12. A production method for a mirror device, comprising the following steps:
    developing a pivotably mounted micromirror of the mirror device, which has a reflective surface upon which a beam of light emitted by a light source of the mirror device or by an external light source impinges during an operation of the mirror device in such a way that when the micromirror is excited from a neutral position of the micromirror to an oscillatory motion about an axis of rotation, a first impingement angle of the beam of light impinging upon the oscillating micromirror varies within a first value range; and
    positioning a cover element which is immovable in relation to a mounting of the micromirror and is transparent to the beam of light emitted by the light source relative to the micromirror in such a way that the beam of light emitted by the light source impinges through the cover element upon the reflective surface of the micromirror, is reflected at the reflective surface to an inner surface of the cover element, and a portion of the light impinging upon the inner surface is reflected at the inner surface onto the reflective surface as a reflection beam, the cover element being aligned at an incline at an angle of inclination in relation to the micromirror situated in its neutral position;
    wherein the angle of inclination is specified in such a way that a second impingement angle of the reflection beam impinging upon the oscillating micromirror varies within a second value range; and
    wherein the reflective surface of the micromirror is at least partially covered with a coating, which has a reflection coefficient of at least 0.6 for the first value range, and a reflection coefficient of maximally 0.4 for the second value range,
    wherein the micromirror is configured in such a way that the micromirror is excitable from its neutral position to the oscillatory motion about the axis of rotation for all adjustment angles $\beta$ in an adjustment angular range between $-\beta_{max}$ and $\beta_{max}$ in relation to the neutral position of the micromirror, and the angle of inclination $\gamma$ is specified in such a way that $\gamma > 2\beta_{max}$ applies to the angle of inclination $\gamma$.

\* \* \* \* \*